US012765687B2

(12) United States Patent
Shih

(10) Patent No.: US 12,765,687 B2
(45) Date of Patent: Oct. 20, 2026

(54) VIBRATOR AND ELECTRIC BED HAVING THE SAME

(71) Applicant: Chuan-Hang Shih, Changhua County (TW)

(72) Inventor: Chuan-Hang Shih, Changhua County (TW)

(73) Assignee: STAR SEEDS CO., LTD., Taichung City (TW)

( * ) Notice: Subject to any disclaimer, the term of this patent is extended or adjusted under 35 U.S.C. 154(b) by 1004 days.

(21) Appl. No.: 17/991,096

(22) Filed: Nov. 21, 2022

(65) Prior Publication Data

US 2024/0122361 A1 Apr. 18, 2024

(30) Foreign Application Priority Data

Oct. 17, 2022 (TW) .................................. 111139286

(51) Int. Cl.

*A47C 21/00* (2006.01)
*A47C 31/00* (2006.01)
*A61H 23/02* (2006.01)

(52) U.S. Cl.

CPC .......... *A47C 21/006* (2013.01); *A47C 21/003* (2013.01); *A47C 31/003* (2013.01); *A61H 23/0218* (2013.01); *A61H 23/0236* (2013.01); *A61H 2201/0134* (2013.01); *A61H 2201/0142* (2013.01); *A61H 2201/0192* (2013.01); *A61H 2201/5048* (2013.01)

(58) Field of Classification Search

CPC .................................................... A47C 21/006
See application file for complete search history.

(56) References Cited

U.S. PATENT DOCUMENTS

| | | | | | |
|---|---|---|---|---|---|
| 3,279,849 | A | * | 10/1966 | Radke | A47C 7/425 297/284.5 |
| 4,268,557 | A | * | 5/1981 | Bracesco | B29C 44/428 428/71 |
| 5,437,607 | A | * | 8/1995 | Taylor | A61H 7/001 601/49 |
| 2008/0036303 | A1 | * | 2/2008 | Stevens | A61H 1/005 310/12.04 |

FOREIGN PATENT DOCUMENTS

| | | | | | |
|---|---|---|---|---|---|
| CN | 201304069 | Y | * | 9/2009 | |
| CN | 105899181 | A | * | 8/2016 | A61H 23/0236 |
| CN | 107374931 | A | * | 11/2017 | A61H 23/02 |
| CN | 110711132 | A | * | 1/2020 | A61H 23/004 |
| CN | 210124351 | U | * | 3/2020 | |
| CN | 113116697 | A | * | 7/2021 | A47C 21/006 |
| WO | WO-2016065317 | A1 | * | 4/2016 | A61H 23/02 |

* cited by examiner

*Primary Examiner* — Joseph D. Boecker
*Assistant Examiner* — Thomas W Greig
(74) *Attorney, Agent, or Firm* — Muncy, Geissler, Olds & Lowe, P.C.

(57) ABSTRACT

A vibrator includes a base seat, a magnetic member, and a cover. By reciprocating motions of the magnetic member relative to a wire coil of the vibrator, a novel effect of vibrating massage is provided. The vibrator is applicable to an electric bed including a fixation frame, a moveable frame, an actuator, a support member, and a cushion pack. The actuator drives the moveable frame to move relative to the fixation frame, and the vibrator is disposed to the support member by the cushion pack. By transmitting a sound signal to the vibrator, the vibrator provides an effect of vibration or massage in synchronousness with the sound signal.

12 Claims, 5 Drawing Sheets

VIBRATOR AND ELECTRIC BED HAVING THE SAME

BACKGROUND OF THE INVENTION

1. Field of the Invention

The present invention relates generally to an electric device and more particularly, to a vibrator and an electric bed having the vibrator.

2. Description of the Related Art

A vibrator, which is generally used as a massage device, can massage the tight muscle of the user through vibration to relieve discomfort, so that the user can relax the body and eliminate fatigue. Traditional vibrators mostly use motors to rotate an asymmetric block, such as eccentric wheel, to generate vibrations. As such, the vibrations generated by this type of vibrator are more divergent in direction, and the vibration force cannot be concentrated in a specific direction. Therefore, only a certain massage effect can be provided.

In order to provide consumers with the function of enjoying massage while resting, many electric beds have additionally provided vibrating massage functions. However, consumers have lost the freshness of the massage effect of traditional vibrators. Therefore, an issue of providing a novel vibrating massage experience to consumers that use electric beds needs to be solved by the industry. In another aspect, the conventional electric bed usually controls the vibrating massage device to synchronously operate with the speakers installed on the bed, thereby providing a synergy effect of sound and body sensation to the user. However, because the signal controlling the vibration motor is different from the signal controlling the speaker, an addition signal conversion is required for approaching synchronousness between the vibrator and the speaker. The problem of such design lies in that a complete synchronousness may not be achieved and the manufacturing cost may not be reduced due to the requirement of additional converter for performing signal conversion.

In view of above, how to provide a vibrator with a different vibrating effect compared to the traditional vibrator, and provide an electric bed with a novel vibrating massage effect with lower cost will be a key challenge to be overcome.

SUMMARY OF THE INVENTION

The present invention has been accomplished in view of the above-noted circumstances. It is an objective of the present invention to provide a vibrator, which can provide a novel vibrating massage effect.

It is another objective of the present invention to provide an electric bed having the vibrator, which can provide a massage function different from that of the conventional electric bed, and can output sound and vibration synchronously in association with a stereo device with low cost.

To attain the above objective, the present invention provides a vibrator comprising a base seat, a magnetic member, and a cover. The base seat is provided with a chamber at an inside thereof, and an opening in communication with the chamber and an outside of the base seat. The magnetic member is moveably disposed in the base seat, located in the chamber, and provided with a recessed ring portion. The cover includes a cap body disposed on the base seat to close the opening, and a wire coil disposed with the cap body and extending into the recessed ring portion in a way that a gap is left between the wire coil and the magnetic member. By means of reciprocating motions of the magnetic member relative to the wire coil, a unidirectional vibration can be produced, thereby providing a novel vibrating massage effect.

To attain the above-mentioned another objective, the present invention provides an electric bed comprising a fixation frame, a moveable frame, an actuator, a support member, a cushion pack, and a vibrator. The movable frame is moveably disposed to the fixation frame. The actuator is connected between the fixation frame and the moveable frame to drive the moveable frame to move relative to the fixation frame. The support member is disposed to one of the fixation frame and the moveable frame and provided with a support surface, a bottom surface opposite to the support surface, and a hollow portion penetrating through the support surface and the bottom surface. The cushion pack is disposed to the support member in a way that the cushion pack is inserted in the hollow portion of the support member. The cushion pack is provided with a top surface that is flesh with or protrudes upwardly over the support surface, and an inner accommodation. The vibrator is disposed in the inner accommodation of the cushion pack. The position of the moveable frame relative to the fixation frame can be adjusted by controlling the actuator in accordance with actual need to achieve the goal of providing a comfortable lying effect. Further, by transmitting a sound signal to actuate the vibration, a vibrating effect in synchronousness with sound can be provided.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
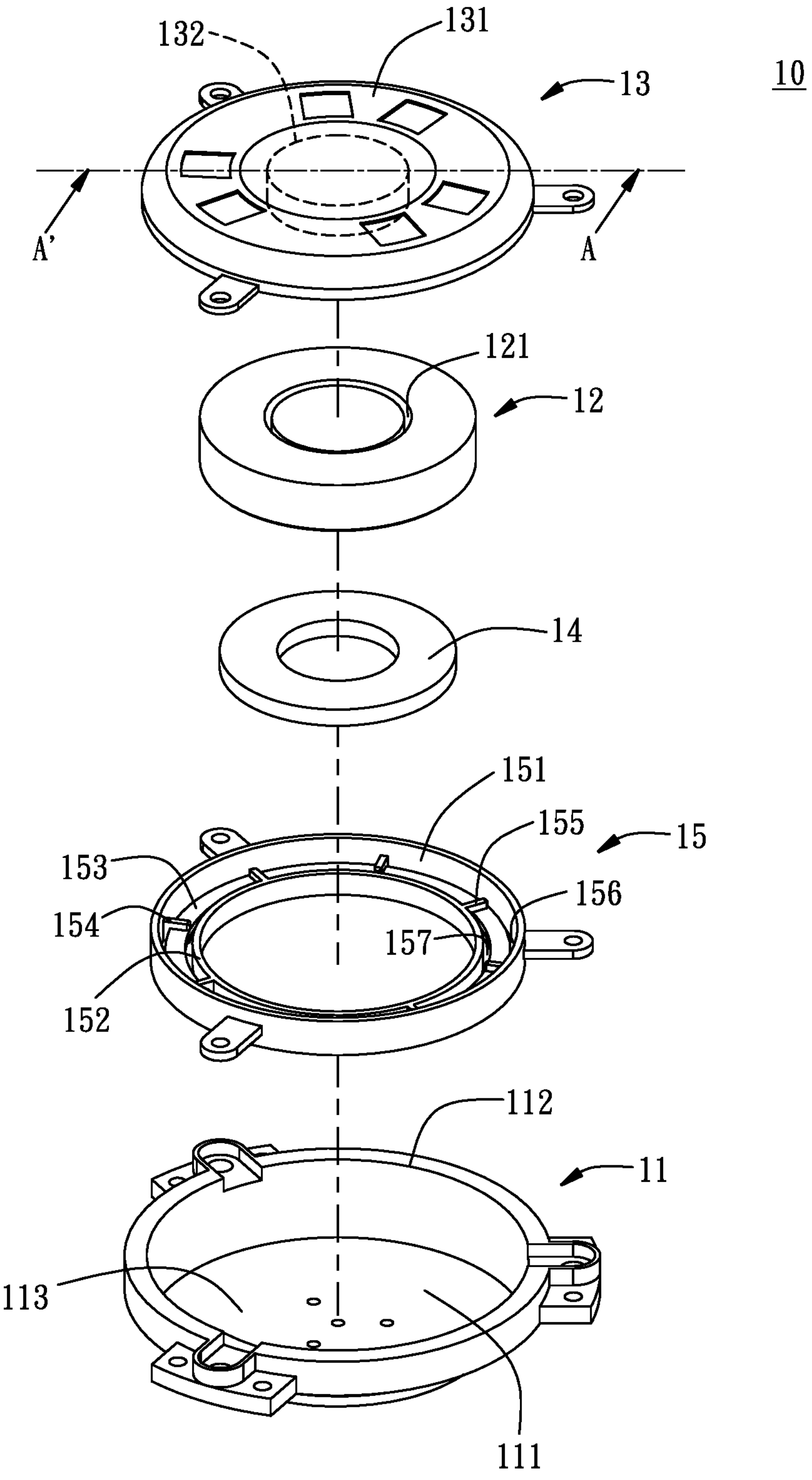
FIG. 1 is an exploded view of a vibrator according to an embodiment of the present invention.
Figure 2:
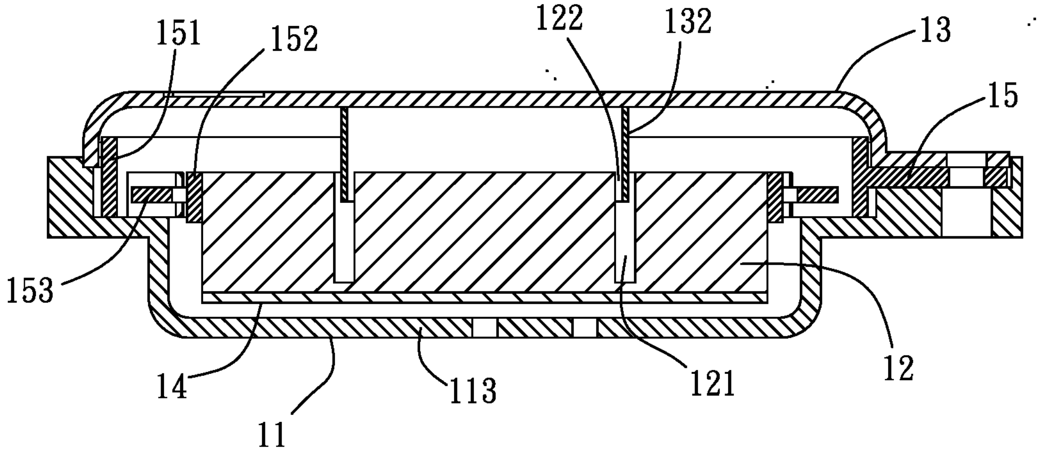
FIG. 2 is a sectional view taken alone line A-A of FIG. 1 while the vibrator is assembled.
Figure 3:
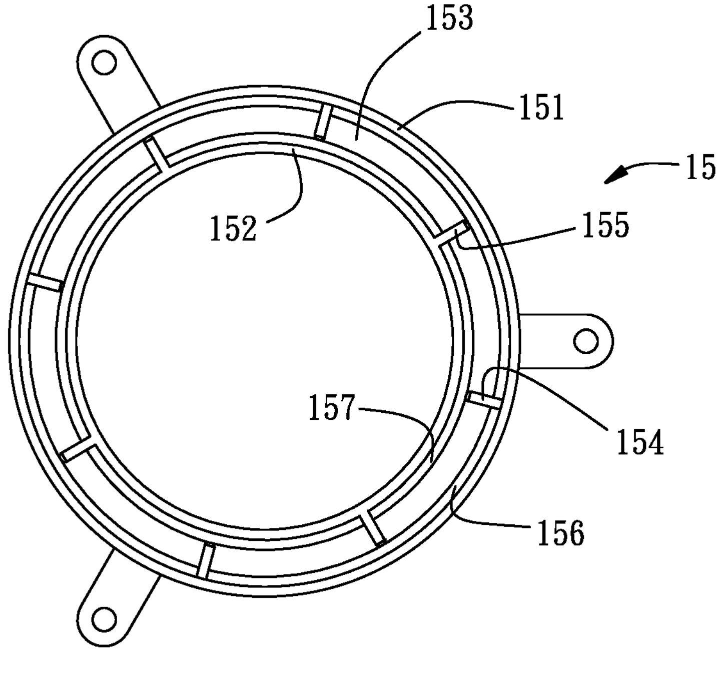
FIG. 3 is a top view of a ring mount of the vibrator of the embodiment of the present invention.

The structure and technical features of the present invention will be detailedly described hereunder by an embodiment and accompany drawings. As shown in FIGS. 1-3, the vibrator 10 provided in accordance with an embodiment of the present invention comprises a base seat 11, a magnetic member 12, a cover 13, and a cushion pad 14.

The base seat 11 includes a chamber 111, an opening 112, and a bottom portion 113. The chamber 111 is provided at an inside of the base seat 11 for accommodating the magnetic member 12, the opening 112 is in communication with the chamber 111 and an outside of the base seat 11, i.e., ambient environment, and the bottom portion 113 is located at a side of the chamber 111, which is remote from the opening 112.

The magnetic member 12 is moveably disposed in the base seat 11, located in the chamber 111, and provided with a recessed ring portion 121. The magnetic member may be (but not limited to) a permanent magnet.

In this embodiment, the magnetic member 12 is disposed in the base seat 11 by a ring mount 15. The ring mount 15 comprises an outer ring 151, an inner ring 152, a middle ring 153, a plurality of first ribs 154, and a plurality of second ribs 155. The outer ring 151 and the inner ring 152 are connected with the base seat 11 and the magnetic member 12, respectively. The middle ring 153 is located between the outer ring 151 and the inner ring 152. The first ribs 154 are used to connect the outer ring 151 with the middle ring 153, and the second ribs 155 are used to connect the middle ring 153 with the inner ring 152. Further, the first ribs 154 and the second ribs 155 are alternately arranged on the middle ring 153, and the ring mount 15 is made of elastic material and configured in a way that the inner ring 152 and the outer ring 151 can move in an axial direction relative to each other, resulting in that the magnetic member 12 can reciprocatingly move up and down relative to the base seat 11. Moreover, a gap 156 is provided between the outer ring 151 and the middle ring 153, and another gap 157 is provided between the middle ring 153 and the inner ring 152, such that the outer ring 151, the inner ring 152 and the middle ring 153 will not rub with each other when the magnetic 12 is moving, thereby ensuring smooth movement of the magnetic member 12.

The cover 13 includes a cap body 131 and a wire coil 132. The cap body 131 is mounted to the base seat 11 by screws (not shown) to close the opening 112. The wire coil 132 is mounted to the cap body 131 and extends into the recessed ring portion 121 of the magnetic member 12 in such a way that a gap 122 is left between the wire coil 132 and the magnetic member 12, thereby ensuring that the magnet member 12 will not contact and rub the wire coil 132 while the magnetic member 12 is moving.

The cushion pad 14 is mounted to a bottom surface of the magnetic member 12 and located between the magnetic member 12 and the bottom portion 113 of the base seat 11. There is a gap left between the cushion pad 14 and the bottom portion 113, thereby avoiding the magnetic member 12 from direct impact with the bottom portion 113 to produce noise.

When the vibrator 10 is in use, a signal, such as a sound signal, is inputted into the wire coil 132. As soon as the wire coil 132 receives the signal, a magnetic force is produced to drive the magnetic member 12 to axially and reciprocatingly move relative to the wire coil 132. Because the magnetic member 12 has a certain weight, the vibrator 10 will produces unidirectional vibrations due to the reciprocating movement of the magnetic member 12.

Figure 4:
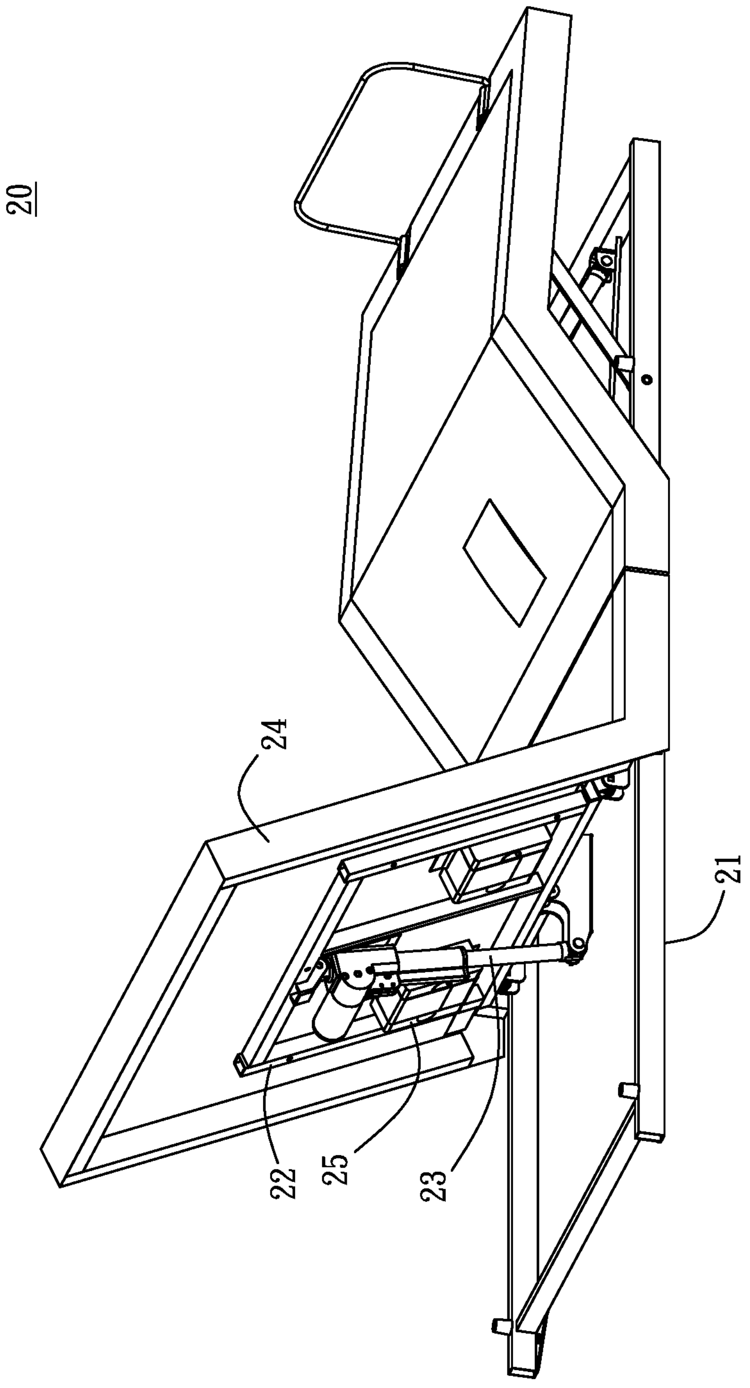
FIG. 4 is a perspective view of an electric bed having the vibrator according to an embodiment of the present invention.
Figure 5:
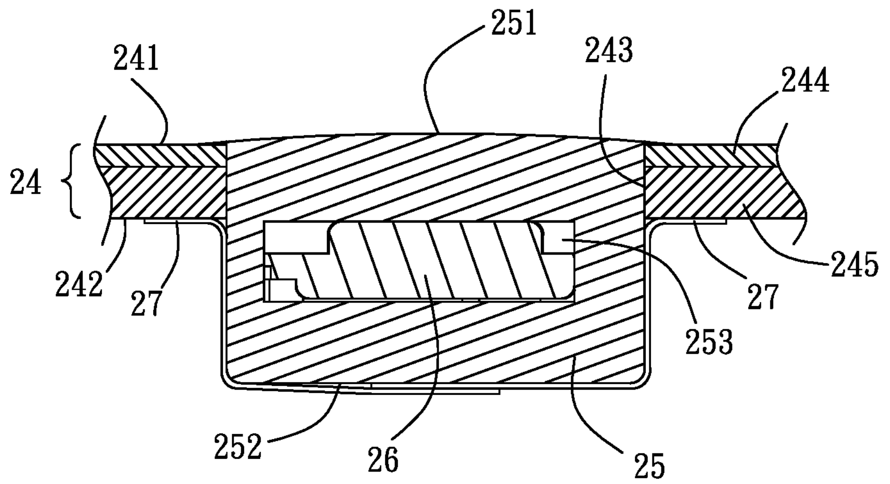
FIG. 5 is a sectional view of a part of the electric bed having the vibrator of the embodiment of the present invention.
Figure 6:
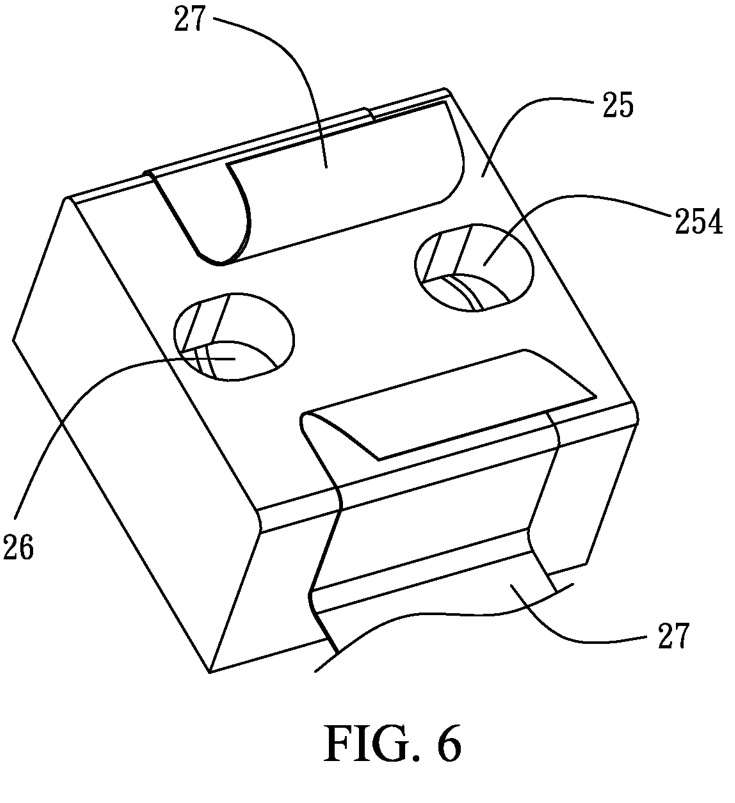
FIG. 6 is a perspective view showing the vibrator of the electric bed is installed in a cushion pack.

Referring to FIGS. 4-6, an electric bed 20 having the vibrator 10 is provided in accordance with an embodiment of the present invention. The electric bed 20 comprises a fixation frame 21, a moveable frame 22, an actuator 23, a support member 24, a cushion pack 25, and the vibrator 10.

The fixation frame 21 may be (but not limited to) a rectangular rack for standing on the ground or other plane.

The moveable frame 22 may also be a rectangular rack, which is moveably mounted on the fixation frame 21. For example, the moveable frame 22 may be mounted on the fixation frame 21 by one or more pivotal members, such that the moveable frame 22 is swingable relative to the fixation frame 21. The moveable frame 22 may comprises a first moveable part (the left part shown in FIG. 4) for supporting a user's upper body, and a second moveable part (the right part shown in FIG. 4) for supporting the user's legs. It is to be noted that the way of mounting the moveable frame 22 to the fixation frame 21 is not limited to this embodiment.

The actuator 23 is connected between the fixation frame 21 and the moveable frame 22 to drive the moveable frame 22 to move relative to the fixation frame 21, such that the position of the moveable frame 22 relative to the fixation frame 21 can be adjusted. The actuator 23 comprises a motor and a telescope rod drivenable by the motor. By means of operating the motor to drive the telescope rod to extend or retract, the moveable frame 22 is driven to change its position. However, the way of driving the moveable frame 22 is not limited to this embodiment.

The support member 24 is configured to be mounted to the fixation frame 21 or the moveable frame 22. In this embodiment, the support member 24 is mounted to the moveable frame 22 for illustrative purpose. The support member 24 has a support surface 241, a bottom surface 242, and a hollow portion 243. The support surface 241 is used to support a mattress or a user, thereby enabling the user to lie or lean thereon. The bottom surface 242 is opposite to the support surface 241. As shown in FIG. 5, the support surface 241 and the bottom surface 242 are located at the upper lateral side and the lower lateral side of the support member 24, respectively. The hollow portion 243 penetrates through the support surface 241 and the bottom surface 242. In another aspect, the support member 24 may be composed of a pad portion 244 and a bottom portion 245 piled one after another to form a two-layered structure. The bottom portion 245 may be formed by a wood plate, a metal net, or any object having a support function. The pad portion 244 may be formed by a soft pad or a material that can provide cushion function. In another embodiment, the pad portion 244 may be omitted. That is, only the bottom portion 245 is provided.

The cushion pack 25 is mounted to the support member 24 and inserted into the hollow portion 43. Specifically, the cushion pack 25 is made by a foam material or elastic material. The cushion pack 25 is mounted to the support member 24 by two loop-and-hook fastening belts 27. The two loop-and-hook fastening belts 27 each have a first end and a second end opposite to the first end. The first ends of the two loop-and-hook fastening belts 27 are fixed to the bottom surface 242 of the support member 24, respectively. The second ends of the two loop-and-hook fastening belts 27 are fixedly engaged with each other and located at a bottom surface 252 of the cushion pack 25. In another embodiment, the cushion pack 25 may be fixedly mounted to the support member 24 by another feasible way. The cushion pack 25 is provided with a top surface 251 that is flesh with or protrudes upwardly over the support surface 241. As shown in FIG. 5, the top surface 251 of the cushion pack 25 protrudes upwardly over the support surface 241, thereby effectively transmitting the vibrations upwardly. Further, the cushion pack 25 has an inner accommodation 253 for receiving the vibrator 10.

As shown in FIG. 6, the cushion pack 25 is provided with one or more air permeable holes 254 in communication with the inner accommodation 253 and an outside of the cushion pack 25, i.e., the ambient environment, for dissipating the heat generated by the vibrator 10 in operation. In this embodiment, the cushion pack 25 has two air permeable holes 254 opened on the bottom surface 252. In another embodiment, the cushion pack 25 may be omitted.

The vibrator 10 is received in the inner accommodation 253 of the cushion pack 25. The outer periphery of the vibrator 10 is completely encased by the cushion pack 25, such that the vibrations produced by the vibrator 10 can be used to massage the user. During operation of the vibrator 10, the temperature of the vibrator 10 may raise. The air permeable holes 254 will be helpful for heat dissipation, thereby preventing the vibrator 10 from overheat.

In view of the above illustration, a user may lie on the support member 24 of the electric bed 10 and controls the actuator 23 in accordance with his/her need to adjust the moveable frame 22 to a desired position relative to the fixation frame 21. Further, by means of inputting a control signal into the vibrator 10, the user may operate the vibrator 10 to vibrate in accordance with the inputted signal. For example, sound signal or music signal having various melodies may be used as the control signal to produce new somatosensory massage different from the past. Further, by means of adjusting the frequency and amplitude of the inputted signal, the frequency and magnitude of the vibrations can be controlled. As a result, the vibrator 10 of the present invention can provide new, various vibrating effects.

Based on the technical features of the present invention, various modifications to the vibrator 10 may be made. For example, the vibrator 10 may be configured without the cushion pad 14, the structure of the ring mount 15 may be modified to a feasible way allowing smooth movement of the magnetic member 12.

Figure 7:
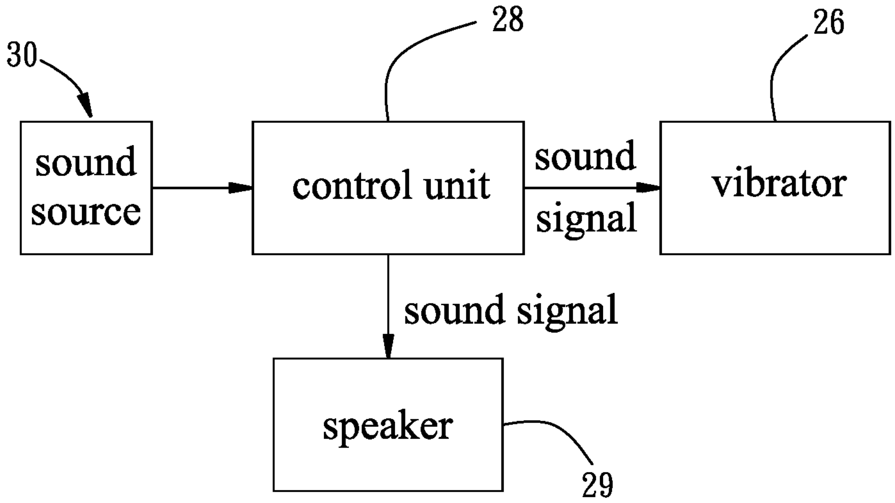
FIG. 7 is a schematic diagram showing a control unit of the electric bed having the vibrator.

Referring to FIG. 7, the electric bed 20 of the present invention may further comprises a control unit 28 and a speaker 29. The control unit 28 is electrically connected with the vibrator 10. The control unit 28 receives a sound signal from a sound source 30, such as a music player or a handheld portable device. By means of a physical wire or a wireless transmission, the sound signal (such as music signal) is transmitted to the control unit 28, which is in turn transmitted to the vibrator 10 to enable the vibrator 10 to generate vibrations along with the sound signal, thereby achieving the goal of controlling the vibrator 10 by inputting the sound signal. Moreover, the speaker 29 is electrically connected with the control unit 28. The control unit 28 further transmits the sound signal to the speaker 29 to enable the vibrator 10 and the speaker 29 to produce vibration and sound respectively and synchronously. In this way, while listening to the sound provided by the speaker, the user can also experience the vibration massage in synchronousness with the sound, so that both body and mind can be relaxed. In other words, the electric bed of the present invention can provide a massage function different from the traditional one, and can output sound and vibration synchronously by association with stereo device. Since the electric bed of the present invention does not use the conventional technology of adopting additional signal conversion to approach synchronousness of vibrator and specker, the electric bed of the present invention may have a low manufacturing cost.

The above-mentioned variations are not to be regarded as a departure from the spirit and scope of the invention, and all such modifications as would be obvious to one skilled in the art are intended to be included within the scope of the following claims.

What is claimed is:

1. A vibrator, comprising:

a base seat provided with a chamber at an inside of the base seat, and an opening in communication with the chamber and an outside of the base seat;

a magnetic member moveably disposed in the base seat and located in the chamber, the magnetic member being provided with a recessed ring portion, wherein the magnetic member is disposed in the base seat by a ring mount; the ring mount comprises an outer ring connected with the base seat, an inner ring connected with the magnetic member, a middle ring located between the outer ring and the inner ring, a plurality of first ribs connected with the outer ring and the middle ring, and a plurality of second ribs connected with the middle ring and the inner ring; a gap is provided between the outer ring and the middle ring, and another gap is provided between the middle ring and the inner ring; and a cover including a cap body disposed on the base seat to close the opening, and a wire coil disposed with the cap body and extending into the recessed ring portion in a way that a gap is left between the wire coil and the magnetic member.

2. The vibrator as claimed in claim 1, further comprising a cushion pad disposed with the magnetic member; the base seat comprises a bottom portion at a side of the chamber that is remote from the opening; the cushion pad is disposed between the magnetic member and the bottom portion of the base seat.

3. The vibrator as claimed in claim 1, further comprising a cushion pad disposed with the magnetic member; the base seat comprises a bottom portion at a side of the chamber that is remote from the opening; the cushion pad is disposed between the magnetic member and the bottom portion of the base seat.

4. An electric bed, comprising:

a fixation frame;

a movable frame moveably disposed to the fixation frame;

an actuator connected between the fixation frame and the moveable frame to drive the moveable frame to move relative to the fixation frame;

a support member disposed to one of the fixation frame and the moveable frame and provided with a support surface, a bottom surface opposite to the support surface, and a hollow portion penetrating through the support surface and the bottom surface;

a cushion pack disposed to the support member in a way that the cushion pack is inserted in the hollow portion of the support member, the cushion pack being provided with a top surface that is flesh with or protrudes upwardly over the support surface, and an inner accommodation; and a vibrator disposed in the inner accommodation of the cushion pack, wherein the vibrator comprises:

a base seat provided with a chamber at an inside of the base seat, and an opening in communication with the chamber and an outside of the base seat;

a magnetic member moveably disposed in the base seat and located in the chamber, the magnetic member being provided with a recessed ring portion, wherein the magnetic member is disposed in the base seat by a ring mount; the ring mount comprises an outer ring connected with the base seat, an inner ring connected with the magnetic member, a middle ring located between the outer ring and the inner ring, a plurality of first ribs connected with the outer ring and the middle ring, and a plurality of second ribs connected with the middle ring and the inner ring; a gap is provided between the outer ring and the middle ring, and another gap is provided between the middle ring and the inner ring; and a cover including a cap body disposed on the base seat to close the opening, and a wire coil disposed with the cap body and extending into the recessed ring portion in a way that a gap is left between the wire coil and the magnetic member.

5. The electric bed as claimed in claim 4, wherein the vibrator further comprises a cushion pad disposed with the magnetic member; the base seat comprises a bottom portion at a side of the chamber that is remote from the opening; the cushion pad is disposed between the magnetic member and the bottom portion of the base seat.

6. The electric bed as claimed in claim 4, wherein the vibrator further comprises a cushion pad disposed with the magnetic member; the base seat comprises a bottom portion at a side of the chamber that is remote from the opening; the cushion pad is disposed between the magnetic member and the bottom portion of the base seat.

7. The electric bed as claimed in claim 4, wherein the cushion pack is disposed to the support member by two loop-and-hook fastening belts; the two loop-and-hook fastening belts each have a first end and a second end; the first ends of the two loop-and-hook fastening belts are disposed to the support member respectively, and the second ends of the two loop-and-hook fastening belts are engaged with each other and located at a bottom surface of the cushion pack.

8. The electric bed as claimed in claim 4, wherein the vibrator has an outer periphery encased by the cushion pack.

9. The electric bed as claimed in claim 8, wherein the cushion pack comprises an air permeable hole in communication with the inner accommodation and an outside of the cushion pack.

10. The electric bed as claimed in claim 7, wherein the cushion pack comprises an air permeable hole in communication with the inner accommodation and an outside of the cushion pack.

11. The electric bed as claimed in claim 4, further comprising a control unit electrically connected with the vibrator; the control unit transmits a sound signal to the vibrator such that the vibrator generates vibrations along with the sound signal.

12. The Electric bed as claimed in claim 11, further comprising a speaker electrically connected with the control unit; the control unit transmits the sound signal to the speaker such that when speaker produces sound, the vibrator generates the vibrations synchronously.

* * * * *